A. KINGSBURY.
BEARING.
APPLICATION FILED MAY 16, 1921.
1,422,448.                                             Patented July 11, 1922.
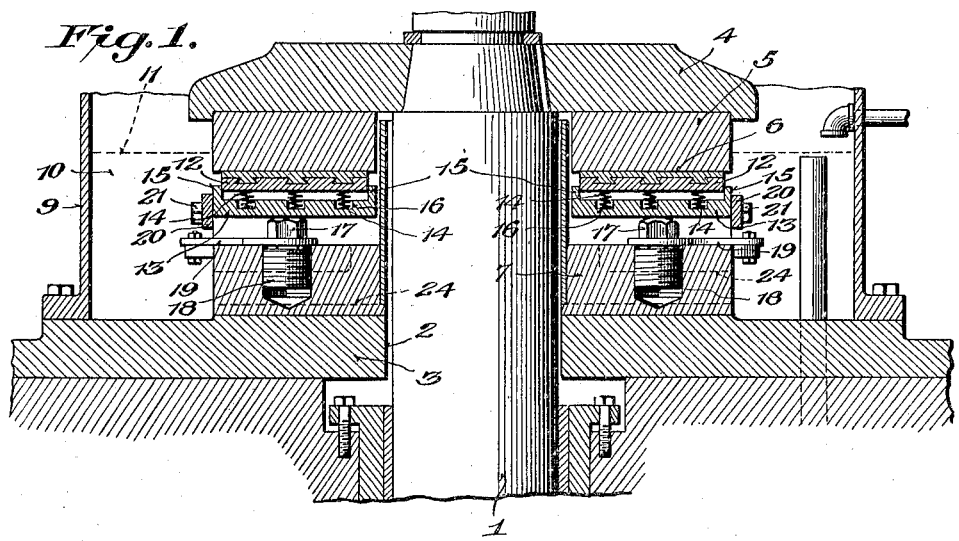
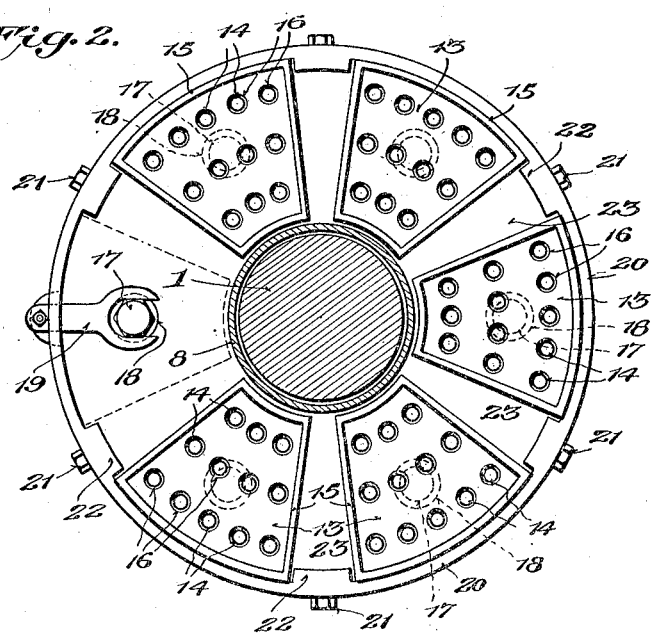
Albert Kingsbury, Inventor
By Mauro, Cameron, Lewis & Kerkam
Attorneys

UNITED STATES PATENT OFFICE.

ALBERT KINGSBURY, OF GREENWICH, CONNECTICUT.

BEARING.

1,422,448.  Specification of Letters Patent.  Patented July 11, 1922.

Application filed May 16, 1921. Serial No. 470,044.

*To all whom it may concern:*

Be it known that I, ALBERT KINGSBURY, a citizen of the United States, and a resident of Greenwich, Connecticut, have invented new and useful Improvements in Bearings, which invention is fully set forth in the following specification.

This invention relates to bearings and, more particularly, to bearings which employ one or more segmental bearing shoes which are movably mounted so as to provide for the maintenance of the proper cooperative relation between the bearing surfaces.

An object of this invention is to provide a bearing in which the relatively movable bearing members include one or more novel segmental bearing shoes so constructed and arranged as to facilitate the maintenance of a proper cooperative relation between the opposed bearing surfaces notwithstanding any crowning, warping or distortion of the bearing members, or irregularities in their bearing surfaces arising from machining operations or unequal wear, or variations in the plane of bearing engagement such as may arise from the shaft running out of true, etc.

A further object of this invention is to provide a two-part bearing shoe in which the bearing portion of said shoe has a distributed elastic support from the supporting portion of said shoe so as to permit universal movement of said bearing portion with respect to said supporting portion.

Another object of this invention is to provide a two-part bearing shoe in which the bearing portion thereof comprises a flexible member elastically mounted on the supporting portion thereof.

Stated broadly, the invention comprises a two-part bearing shoe having distributed elastic supporting means interposed between the parts of said shoe, the surface-bearing portion of said shoe being preferably, but not necessarily, composed of a relatively flexible member.

The invention is capable of receiving a variety of mechanical expressions, one of which is shown on the accompanying drawing, but it is to be expressly understood that the drawing is for purposes of illustration only and is not to be construed as a definition of the limits of the invention, reference being had to the appended claims for that purpose.

In said drawings:—

Fig. 1 is an axial section of a bearing embodying the present invention; and

Fig. 2 is a plan view of a bearing member composed of a plurality of shoes embodying the present invention, one of said shoes being removed to illustrate suitable supporting means therefor and the surface bearing portions of the remaining shoes being omitted to show the supporting portions and interposed elastic means.

The invention is illustrated on the drawing as embodied in a thrust bearing for a vertical shaft, but it is to be expressly understood that the invention is equally applicable to bearings for horizontal or inclined shafts and is not restricted to use in thrust bearings, as it is also applicable to bearings of other types.

In the form shown, the shaft 1 passes through an aperture 2 in a suitable frame or foundation 3, and carries, attached thereto in any suitable way, a thrust block 4 to which is suitably attached a thrust collar 5 having a bearing surface 6. A base plate 7 carries an inner oil-retaining sleeve 8 closely surrounding the shaft 1, and an outer oil-retaining wall 9 provides with said sleeve 8 an oil well 10 in which the bearing members are immersed, the oil level being represented by the dotted line 11.

Cooperating with the bearing surface 5 of the thrust collar 4 are one or more segmental bearing shoes to which the present invention more particularly relates. Any suitable number of bearing shoes may be employed, the illustrated embodiment comprising six shoes symmetrically spaced around the axis of the shaft. Each of said shoes is composed of a surface-bearing portion 12 and a supporting portion 13, the surface bearing portion 12 preferably, although not necessarily, being sufficiently thin to be relatively flexible and the supporting portion 13 sufficiently thick to be relatively rigid. Interposed between said bearing and supporting portions are distributed elastic supporting means of any suitable construction but preferably taking the form of a cushion of coil springs 14 of any suitable number and distributed in any suitable way between said bearing and supporting portions so as to afford said bearing portion a distributed yielding support. Said springs may be of the same size and so arranged that they urge the surface bearing portion 12 into engagement with the opposed bearing member with substantially uniform pressure, or the size or arrangement of said springs may be so selected as to obtain any desired distribution of the pressure exerted thereby on the cooperating bearing surfaces.

Means are preferably provided for retaining the bearing portion 12 in proper cooperative relation with the supporting portion 13. While such means may be of any suitable construction, as for example dowel pins or lugs on one of said members cooperating with apertures or recesses in the other of said members, the form illustrated comprises a raised rim 15 on the supporting portion 13 which loosely embraces the bearing portion 12 and maintains the two in cooperative relation without interfering with the free movement of the bearing portion. Means are also preferably provided for retaining the springs 14 in proper position and, while said means may be of any suitable construction, that illustrated comprises recesses 16 in the supporting member 13 in which the coil springs are seated.

Said bearing shoes may be mounted in any suitable way, but are preferably so mounted that each shoe as a unit has tilting movement circumferentially of the axis of the bearing or both circumferentially and radially of the bearing. In the form shown, the shoes are respectively mounted on the spherically-faced heads 17 of jack screws 18 threaded into apertures in base plate 7. It is to be expressly understood, however, that any other suitable means for tiltably mounting the respective shoes may be employed if desired. Means are also preferably provided for equitably distributing the bearing pressure between the respective bearing shoes. While said means may be of any suitable construction, as for example a ball and socket equalizer or a flexible equalizing ring, the equitable distribution of pressure in the form shown is accomplished by adjustment of the jack screws 18 in the base plate 7. Lock wrenches 19 are illustrated for retaining said jack screws in adjusted position. Suitable means are also preferably provided for retaining the bearing shoes in position against displacement, and in the form shown a retaining ring 20 is suitably attached to the base plate 7, as by bolts 21, to loosely embrace said bearing shoes, said ring being additionally provided with inwardly directed lugs 22 which cooperate with radial lugs or projections 23 on the base plate 7 to maintain the bearing shoes in proper spaced relation and prevent their rotation with the thrust collar 5. The base plate 7 is also preferably provided with oil passages 24 to provide for the ready circulation of the oil to the inner side of the bearing surfaces.

When installed the jack screws 18 may be so adjusted as to secure an equitable distribution of pressure between the respective bearing shoes but, owing to the construction of said shoes, an exact equalization of pressure between the respective shoes by adjustment of said screws is not necessary. Owing to the tiltable mounting of the shoes afforded by the spherical heads of the jack screws 18 each shoe may tilt circumferentially to provide for the automatic formation of oil films between the bearing surfaces under the wedging action of the lubricating fluid and, at the same time, tilt radially to equalize the pressure between the inner and outer zones of the bearing surfaces in conformity with the principle of the Kingsbury bearing. Furthermore, owing to the elastic mounting of each surface-bearing portion 12 with respect to its supporting portion 13 the bearing portion of each shoe may move universally with respect to its supporting portion, that is it may move both in the direction of the axis of the bearing and flex or tilt in any direction out of its own plane so as to conform with the surface of the opposed bearing member, and this maintenance of proper engagement with the opposed bearing member is still further facilitated when said surface bearing portion 12 is relatively flexible. Therefore, notwithstanding any crowning, warping or distortion of the thrust collar 4, or irregularities in or variation of the plane of its bearing surface 5, the bearing surfaces of the respective shoes will always maintain proper cooperative relation with the opposed bearing member when the bearing members are in relative movement.

Furthermore, a bearing constructed in accordance with the present invention possesses the advantage that careful machining of the cooperating bearing members is not required as the distributed elastic support, especially when employed with a surface bearing portion which is relatively flexible, insures the maintenance of a proper cooperative relation between the bearing surfaces even though the condition of the cooperating bearing surfaces be such that the mounting of the shoes to tilt in all directions does not insure the maintenance of the proper cooperative relation. Furthermore, the shoes can be inserted and withdrawn independently and, when mounted as shown on the drawing, such insertion and withdrawal can be effected without raising the shaft, the adjustable jack screws 18 not only providing for an adjustment of the bearing pressure sustained by the several shoes, and providing for adjustment of the plane of bearing engagement, but also enabling the shoes to be independently inserted and withdrawn when the pressure is relieved on the individual shoes by dropping the corresponding jack screws.

While the embodiment of the invention illustrated on the drawing has been described with considerable particularity it is to be expressly understood that the invention is not limited to the form shown as the invention is capable of receiving a variety of mechanical expressions, some of which will readily suggest themselves to those skilled in the art, while changes may be made in the details of construction, proportion and arrangement of parts, and certain features used without other features thereof, without departing from the spirit of the invention. Reference is therefore to be had to the claims hereto appended for a definition of the limits of said invention.

What is claimed is:

1. A bearing comprising relatively movable bearing members one of which includes a plurality of two-part bearing shoes and distributed elastic means associated with each shoe for supporting one part of said shoe from the other.

2. A bearing comprising relatively movable bearing members one of which includes a plurality of two-part bearing shoes, one of the parts of each shoe being relatively flexible, and elastic means interposed between the parts of each shoe.

3. A bearing comprising relatively movable bearing members one of which includes a plurality of two-part bearing shoes, and a plurality of springs distributed between the parts of each shoe for supporting one of said parts from the other.

4. A bearing comprising relatively movable bearing members one of which includes a plurality of two-part bearing shoes, the part of each shoe cooperating with the opposed bearing member being relatively flexible, and springs interposed between the parts of each shoe.

5. A bearing comprising relatively movable bearing members one of which includes a plurality of two-part bearing shoes, distributed elastic supporting means interposed between the parts of each shoe, and means tiltably mounting each shoe.

6. A bearing comprising relatively movable bearing members one of which includes a plurality of two-part bearing shoes, distributed elastic supporting means interposed between the parts of each shoe, and means for equitably distributing the pressure on the respective shoes.

7. A bearing shoe comprising a surface-bearing portion, a supporting portion, and distributed elastic supporting means interposed between said portions.

8. A bearing shoe comprising a surface-bearing portion, a supporting portion, and a plurality of springs for supporting said bearing portion from said supporting portion.

9. A bearing shoe comprising a surface-bearing portion, a supporting portion, and means interposed between said portions for affording said bearing portion a substantially uniformly distributed elastic support from said supporting portion.

10. A bearing shoe comprising a surface-bearing portion, a supporting portion, one of said portions being flexible, and elastic means interposed between said portions.

11. A bearing shoe comprising a flexible bearing portion, a supporting portion, and a plurality of springs interposed between said portions.

12. A bearing shoe comprising a flexible bearing portion, a supporting portion, and elastic means interposed between said portions.

13. A bearing shoe comprising a flexible bearing portion, a supporting portion, and means interposed between said portions for affording said bearing portion substantially uniformly distributed elastic support from said supporting portion.

14. A bearing shoe comprising a surface-bearing portion, a supporting portion, elastic supporting means interposed between said portions, and means to retain said portions in operative relation.

15. A bearing shoe comprising a surface-bearing portion, a supporting portion, springs interposed between said portions for supporting said bearing portion from said supporting portion, and means on one of said portions for maintaining said springs in operative position.

16. A bearing comprising a plurality of bearing shoes each of which comprises a bearing portion, a supporting portion, interposed distributed elastic means for supporting said bearing portion from said supporting portion, and means mounting each shoe to tilt circumferentially of the bearing.

17. A bearing comprising a plurality of bearing shoes each of which comprises a bearing portion, a supporting portion, interposed distributed elastic means for supporting said bearing portion from said supporting portion, and means mounting said shoes to tilt radially of the bearing.

18. A bearing shoe comprising a surface-bearing portion, a supporting portion, and interposed elastic means whereby said bearing portion may move universally with respect to said supporting portion.

19. A bearing shoe comprising a surface-bearing portion, a supporting portion, and interposed means affording distributed support for said bearing portion and permitting universal movement of the same with respect to said supporting portion.

20. A bearing shoe comprising a surface-bearing portion, a supporting portion, and a cushion of distributed springs interposed between said portions.

21. A bearing shoe comprising a flexible bearing portion, a supporting portion and a cushion of distributed springs interposed between said portions.

22. A bearing shoe comprising a bearing portion, a supporting portion, and elastic means interposed between said portions to permit said bearing portion to move axially with respect to said supporting portion.

23. A bearing shoe comprising a flexible bearing portion, a supporting portion, and elastic means interposed between said portions to permit said bearing portion to flex in all directions to conform with the opposed bearing manner.

24. A bearing shoe comprising a flexible bearing portion, a supporting portion, and interposed elastic means whereby said bearing portion may move universally with respect to said supporting portion.

25. A bearing shoe comprising a flexible bearing portion, a supporting portion, and interposed means affording distributed support for said bearing portion and permitting universal movement of the same with respect to said supporting portion.

26. A bearing shoe comprising a surface bearing portion, a supporting portion, one of said portions being flexible, and a plurality of springs interposed between said portions.

In testimony whereof I have signed this specification.

ALBERT KINGSBURY.